Figure 1:
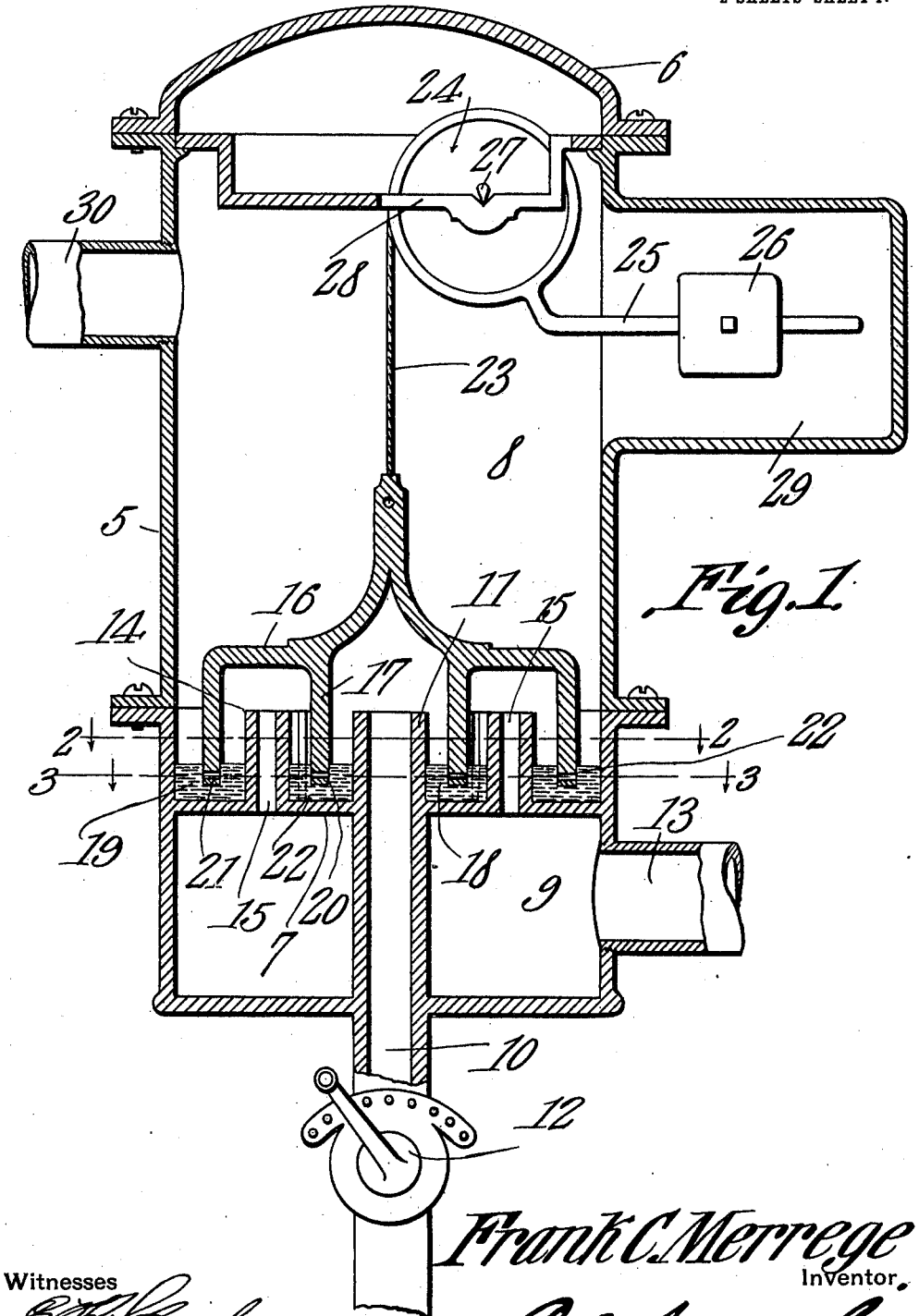

F. C. MERREGE.
GAS AND AIR MIXER.
APPLICATION FILED APR. 14, 1910.

989,174.

Patented Apr. 11, 1911.

2 SHEETS—SHEET 1.

Witnesses

Frank C. Merrege
Inventor
by C. A. Snow & Co.
Attorneys

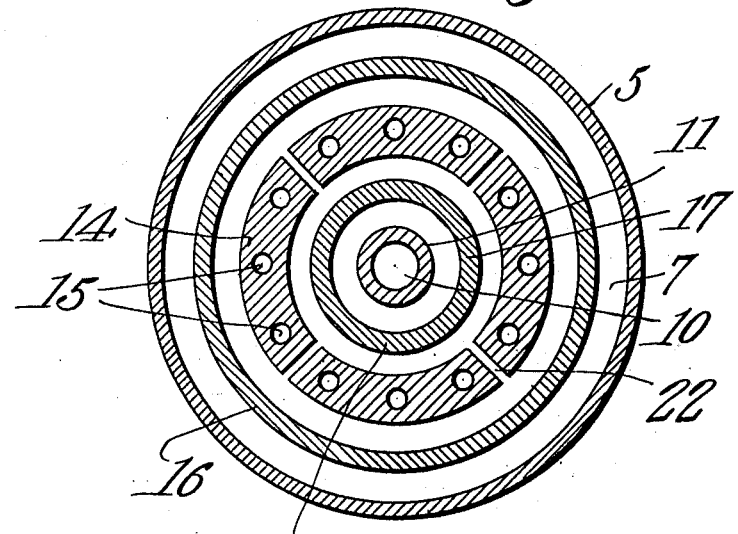
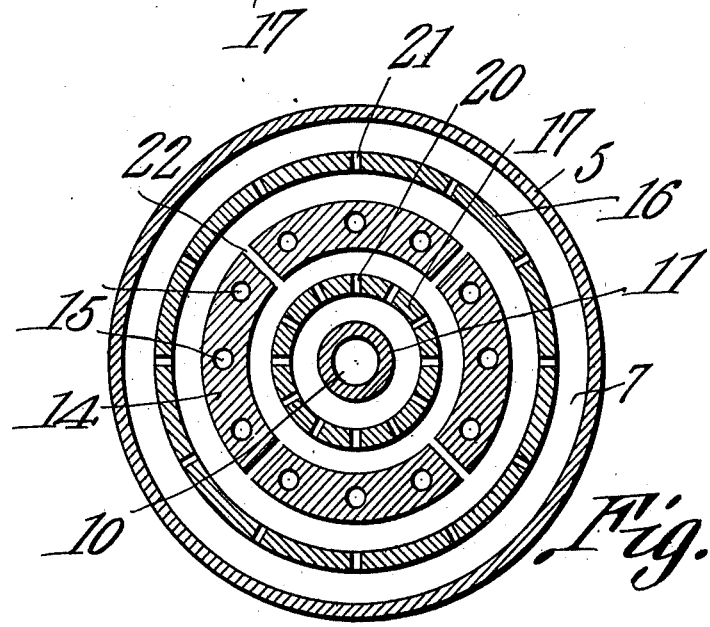

UNITED STATES PATENT OFFICE.

FRANK C. MERREGE, OF MARINE CITY, MICHIGAN, ASSIGNOR TO SAFETY LIGHT & HEATING COMPANY OF AMERICA, OF DETROIT, MICHIGAN.

GAS AND AIR MIXER.

989,174. Specification of Letters Patent. Patented Apr. 11, 1911.

Application filed April 14, 1910. Serial No. 555,322.

*To all whom it may concern:*

Be it known that I, FRANK C. MERREGE, a citizen of the United States, residing at Marine City, in the county of St. Clair and State of Michigan, have invented a new and useful Gas and Air Mixer, of which the following is a specification.

This invention relates to mixing devices employed in connection with that class of gas-making apparatus known as carbureters, and it is the object of the present invention to provide an improved apparatus for mixing air with hydro-carbon vapor or gas in proper proportions to produce an illuminating gas of uniform quality, and to this end the invention consists in a novel construction and arrangement of parts to be hereinafter described and claimed.

In the accompanying drawings forming a part of this specification, Figure 1 is a vertical section of the mixing apparatus. Figs. 2 and 3 are horizontal sections on the lines 2—2 and 3—3, respectively, of Fig. 1.

Referring more particularly to the drawings, 5 denotes a mixing vessel, the same being cylindrical in form, and closed at its ends. The cylinder is positioned vertically, and its upper end is closed by a removable cover 6. Near the bottom of the cylinder is a horizontal partition 7, which divides the interior of the cylinder into upper and lower chambers 8 and 9 respectively. Entering the lower chamber, through the bottom of the cylinder, is an air supply pipe 10 which also passes centrally through the partition 7, and rises a short distance therefrom as indicated at 11, the upper end being open. On the outside of the cylinder, the pipe 10 is provided with a valve 12 for controlling the flow of air therethrough. When the apparatus is in operation, this valve will be set for the amount of air desired. The chamber 9 is also entered, on the side, by a vapor supply pipe 13 leading from the carbureter, which latter may be of any well known kind, and, therefore, has not been illustrated.

From the partition 7 rises a wall 14 which extends in a circle around the upper portion 11 of the air pipe, in spaced relation therewith. In this wall are ducts 15 which pass through the partition, and open at one end into the chamber 9, and at their other ends through the top of said wall into the chamber 8.

In the chamber 8, above the partition 7, is located an inverted bell 16 having its lower open end extending into the space between the wall of the cylinder 5 and the wall 14. The interior of the bell contains a cylindrical partition 17 which extends into the space between the wall 14 and the upper portion 11 of the air pipe. This space contains mercury as indicated at 18, which seals the lower end of the partition 17. The lower end of the bell is sealed by a supply of mercury contained in the space between the cylinder wall and the wall 14, as indicated at 19. Adjacent to the lower edge of the partition 17 is a series of orifices 20, and the bell, adjacent to its lower edge has a series of orifices 21. These two sets of orifices are sealed in the mercury when the bell is in lowered position. In the wall 14 are ducts 22 which open through opposite sides thereof, said ducts being provided for the purpose of maintaining the mercury in the two spaces on opposite sides of the wall at the same level.

The bell 16 is carried by a cable 23 passing over a disk 24 which has a grooved periphery to receive said cable, the latter being made fast to the disk. From the disk projects an arm 25 on which is adjustably mounted a weight 26 serving as a counterbalance for the bell. The disk is poised by a knife edge 27 on a support 28 carried by the upper portion of the chamber 8, this portion of the chamber having a lateral extension or enlargement 29 into which the weighted arm 25 extends. To the chamber 8 is connected a pipe 30 which leads to the gas main.

Fig. 1 shows the bell 16 and the partition 17 sealed in the mercury, and the latter also closing the orifices 20 and 21. With the parts in this position, there can be no flow of air from the pipe 10, nor gas from the chamber 9 into the chamber 8. When gas is to be used, the bell rises until the orifices 21 and 20 are clear of the mercury seal. The vapor or gas entering the chamber 9 by the way of the pipe 13 then passes through the ducts 15 into the bell, and out of the same through the orifices 21 or through the lower end of the bell if said end is above the mercury seal. Air passing through the pipe 10 escapes from the upper portion 11 thereof into the space inclosed by the partition 17, and then enters the bell through the orifices 20, or around the lower edge of the partition, if said edge is above the level of the mercury seal. This air passes across the top of the wall 14, and mixes with the vapor issuing from the ducts 15, the mixture of vapor and air passing out of the bell into the chamber 8 as already described, and passing from the latter into the pipe 30, which carries the mixture to the gas main or the place of use. By passing the air across the upper end of the ducts 15 as described, a thorough mixture of vapor and air is effected, and a gas of uniform quality is produced. The bell is automatically operated by the pressure within the same. It will rise according to the amount of gas which is being used, and when the gas is shut off, the bell lowers to reëstablish the seal.

What is claimed is:

1. A mixing apparatus of the kind stated comprising a vessel having separate air and vapor inlets, and an outlet, a liquid sealed bell in the vessel over said inlets and a seal between the inlets.

2. A mixing apparatus of the kind stated comprising a vessel having separate air and vapor inlets, and an outlet, and a liquid sealed bell over the inlets, said bell having a portion forming a seal between the inlets.

3. A mixing apparatus of the kind stated comprising a vessel, an air inlet pipe entering said vessel, a wall surrounding said air pipe, said wall having gas ducts, a liquid sealed bell surrounding the wall, and a liquid sealed partition carried by the bell, and encircling the air pipe.

4. A mixing apparatus of the kind stated comprising a vessel, an air pipe extending thereinto, a wall encircling the air pipe, and having gas ducts, and a liquid sealed bell over the wall, said bell carrying a portion surrounding the air pipe and forming a seal between the same and the gas ducts, the sealed end of the bell and the portion carried by said bell having orifices.

5. A mixing apparatus of the kind stated comprising a vessel containing a partition dividing the interior of said vessel into upper and lower chambers, an outlet from the upper chamber, a gas inlet to the lower chamber, an air supply pipe passing through the partition, and rising therefrom, a wall on the partition encircling the air supply pipe, said wall having ducts opening on one end into the lower chamber, and at their other ends into the upper chamber, and a liquid sealed bell surrounding the wall, said bell carrying a liquid sealed partition surrounding the air supply pipe.

In testimony that I claim the foregoing as my own, I have hereto affixed my signature in the presence of two witnesses.

FRANK C. MERREGE.

Witnesses:
JOHN C. SPAULDING,
W. L. WHITE.

---

Copies of this patent may be obtained for five cents each, by addressing the "Commissioner of Patents, Washington, D. C."